(12) United States Patent
Zorin et al.

(10) Patent No.: US 8,732,121 B1
(45) Date of Patent: May 20, 2014

(54) METHOD AND SYSTEM FOR BACKUP TO A HIDDEN BACKUP STORAGE

(75) Inventors: Andrey A. Zorin, Moscow (RU);
Serguei M. Beloussov, Singapore (SG);
Maxim V. Lyadvinsky, Moscow (RU);
Maxim V. Goldobin, Moscow (RU)

(73) Assignee: Acronis International GmbH, Schaffhausen (CH)

( * ) Notice: Subject to any disclaimer, the term of this patent is extended or adjusted under 35 U.S.C. 154(b) by 0 days.

(21) Appl. No.: 13/087,541

(22) Filed: Apr. 15, 2011

(51) Int. Cl.
*G06F 17/30* (2006.01)

(52) U.S. Cl.
USPC .......................................... 707/609; 707/640

(58) Field of Classification Search
CPC ................................................ G06F 17/30073
USPC .................................................. 707/609, 640
See application file for complete search history.

(56) References Cited

U.S. PATENT DOCUMENTS

| 7,246,211 | B1* | 7/2007 | Beloussov et al. ............ 711/162 |
| 7,603,533 | B1* | 10/2009 | Tsypliaev et al. ............. 711/167 |
| 2006/0253724 | A1* | 11/2006 | Zhang ................................ 714/2 |
| 2010/0095082 | A1* | 4/2010 | Hull et al. ...................... 711/171 |

* cited by examiner

*Primary Examiner* — Hung Q Pham
(74) *Attorney, Agent, or Firm* — Fish & Richardson P.C.

(57) ABSTRACT

A system for data backup and recovery. A backup storage in a form of a file or a directory is created on a storage media. The backup storage is "hidden" from the file system, form user processes, form an operating system and from a data storage driver. The backup file is visible to only backup/restore application. The data is backed up into the "hidden" backup storage. The files system, the user processes, the operating system and the data storage driver do not know about the backup file and the areas of the storage media occupied by the backup file. When a write request for writing a data block to the space within the storage media occupied by the files of the "hidden" backup is received the write request is redirected to a free space on the storage media.

18 Claims, 13 Drawing Sheets

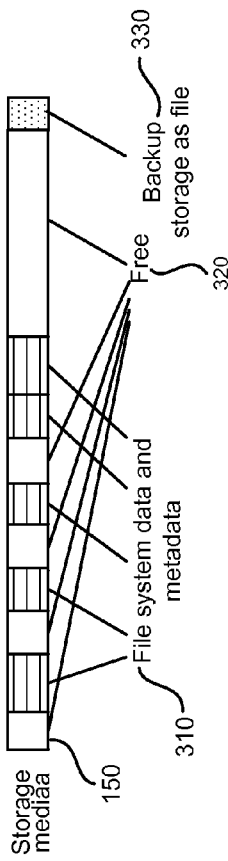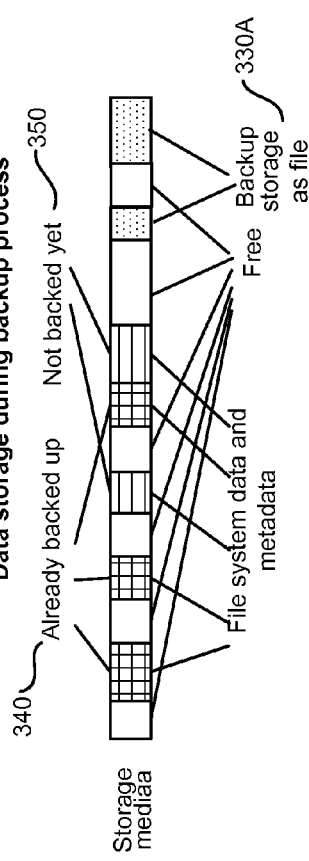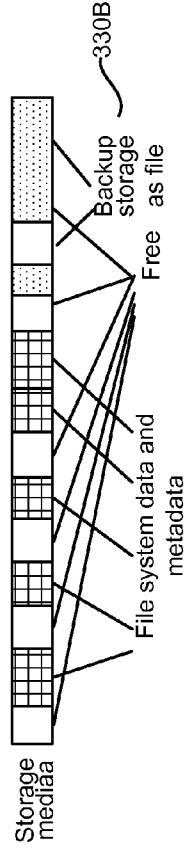

METHOD AND SYSTEM FOR BACKUP TO A HIDDEN BACKUP STORAGE

BACKGROUND OF THE INVENTION

1. Field of the Invention

The present invention relates to continuous data protection, and more particularly to a method for a system or a file backup where the backup file is stored on the same data storage while the backup data blocks are protected from modification by the system or by the user.

2. Background Art

Currently, there are a number of conventional methods that relate to organization of data archiving and protection. One of these methods is a backup of the entire hard drive, which typically involves copying of the hard drive contents onto some other medium (such as, for example, another hard disk drive, a DVD ROM, a DVD RAM, a flash disk, etc.). However, the other medium is not always available.

Typically, a full backup of a hard drive does not include empty disk sectors, since these sector do not contain any data that need to be copied. Instead, the empty data blocks or sectors can be marked in the backup bitmap that can be stored together with the storage backup. Thus, the backup takes up less space.

Drivers of the operating system are not used to create a bitmap. Rather, the storage medium (for example, a disk drive) is read directly, the file system structure is identified, and the data blocks that are being used are identified. It should be noted that although a bitmap is typically created on a data block level, it is possible that the bitmap generation procedure is related to a file system reflection into block space of the storage device, and considers only unused blocks (rather than empty blocks).

Then the data blocks that are being used are tagged with, for example, a "1" in the bitmap, and the unused blocks are tagged as "0" in the bitmap. Note that the size of the data block can be relatively large. For example, it may be larger than a typical sector in a hard disk drive. In other words, there may be a need for a further step that determines which part of the data block is actually being used, if the data block is relatively large. The values used in the bitmap can be other than just binary "0" and "1". As another option, the bitmap can be used to store information about bad (i.e., corrupted) blocks. The bitmap can be created and managed in user space or in OS kernel space.

A typical data storage backup is a file containing data about the backup (e.g., time of creation, a backup number, backup type—incremental, full, pass through, etc.). The backup can contain a bitmap of the backed up data blocks and references to the data blocks within the backup file(s).

A backup file can be implemented in a form of archive. The backup file can also contain information about backed up storage media. For example, it can indicate which sector/partition (C:, D:, etc.) has been backed up. The backup file can contain a size of a partition, a size of a storage media and the actual backed up data blocks.

However, the major problem with the conventional backup schemas is that the backup file can be removed from the storage media. It can be accidentally removed by a user who created the backup, by another user or by an operating system. The backup file can also be corrupted, deleted or infected by malware or a virus.

All of these actions can ultimately result in loss of system functionality. The backup file can even be altered if it is hidden or write protected (by a password) from a file system, operating system or another application. The safe alternative for a backup storage can be an empty space available on the same storage that needs to be backed up. However, none of the conventional systems use this feature.

Accordingly, there is a need in the art for a system that can create a backup file that is hidden from a user, from a file system and from an operating system as well as from other applications. The backup file should only be visible by the backup/restore application that can modify the backup file (add new data blocks) and that can restore the system or data from the backup file.

SUMMARY OF THE INVENTION

Accordingly, the present invention provides a system and method for data protection, and more particularly, a method for file backup where backup file is stored on the same data storage that is being backed up while the data blocks of the backup are protected from modification by a system or a user that substantially obviates one or several of the disadvantages of the related art.

A backup storage in a form of a file or directory is created on a storage media. The backup storage is hidden from the file system, form user processes, form operating system and from the data storage driver. The backup file is visible only to the backup/restore application. The data is backed up into the "hidden" backup storage.

The files system, the user processes, the operating system and the data storage driver do not know about the backup file and the areas of the storage media occupied by the backup file. When a write request for writing a data block to the space within the storage media occupied by the files of the "hidden" backup is received the write request is redirected to a free space on the storage media.

Additional features and advantages of the invention will be set forth in the description that follows. Yet further features and advantages will be apparent to a person skilled in the art based on the description set forth herein or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention. In the drawings:

FIGS. 3A-3C illustrate exemplary embodiments of the system storage with a backup storage implemented as a file, in accordance with the exemplary embodiment;

Figure 5:
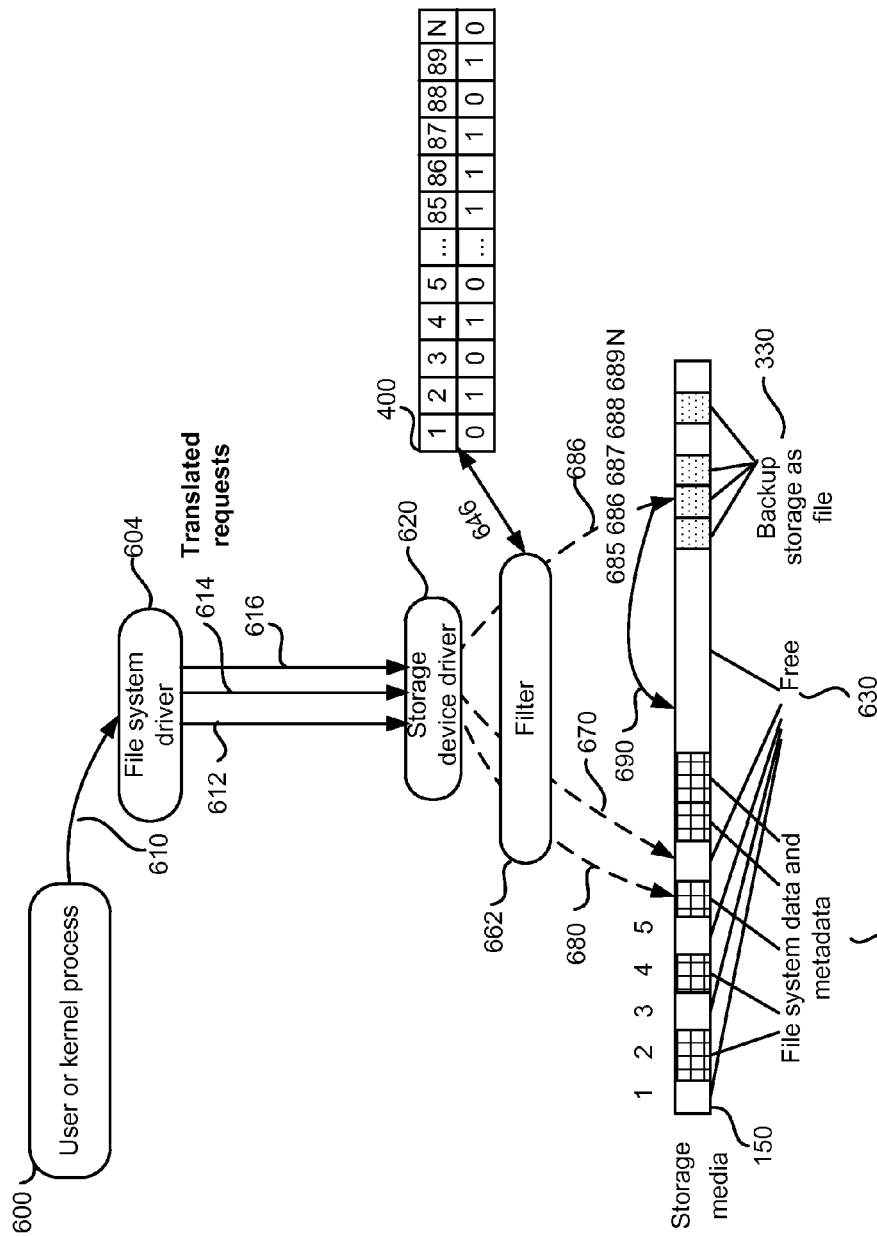
Figure 6:
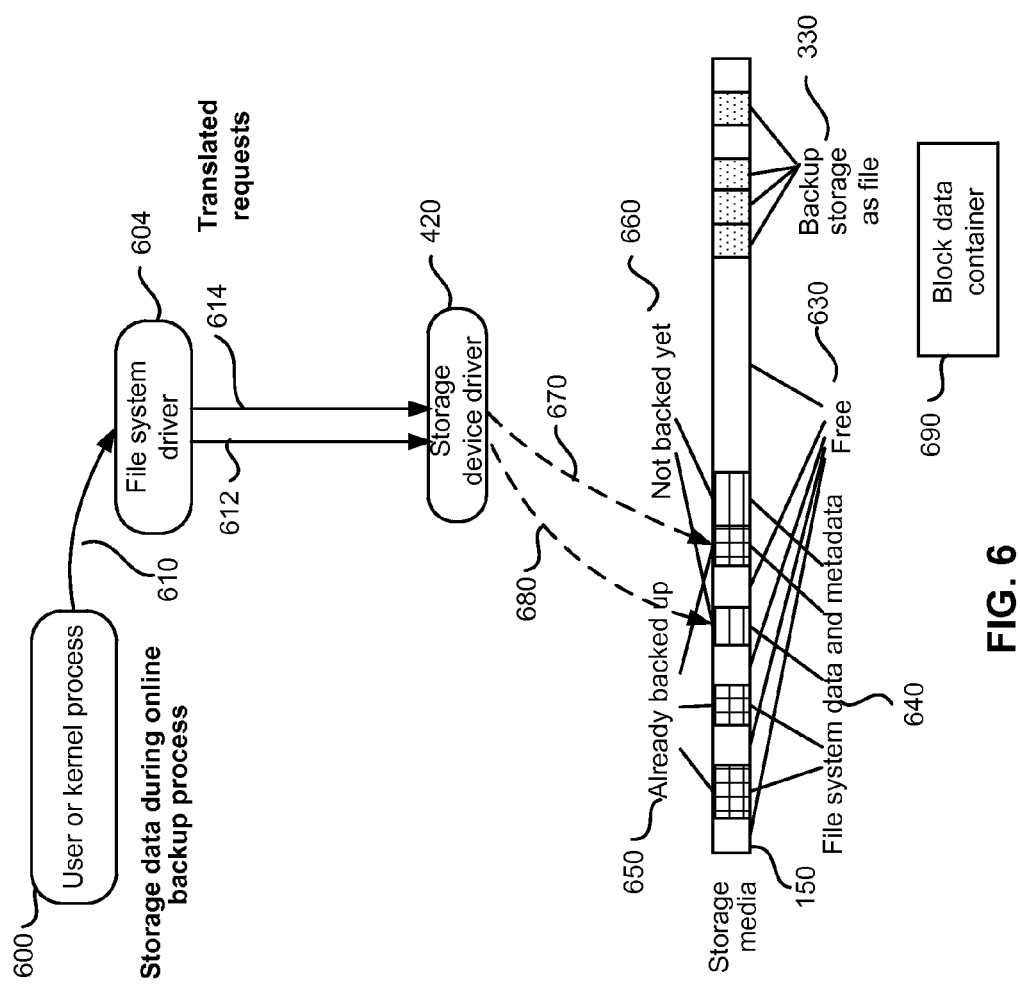
Figure 7:
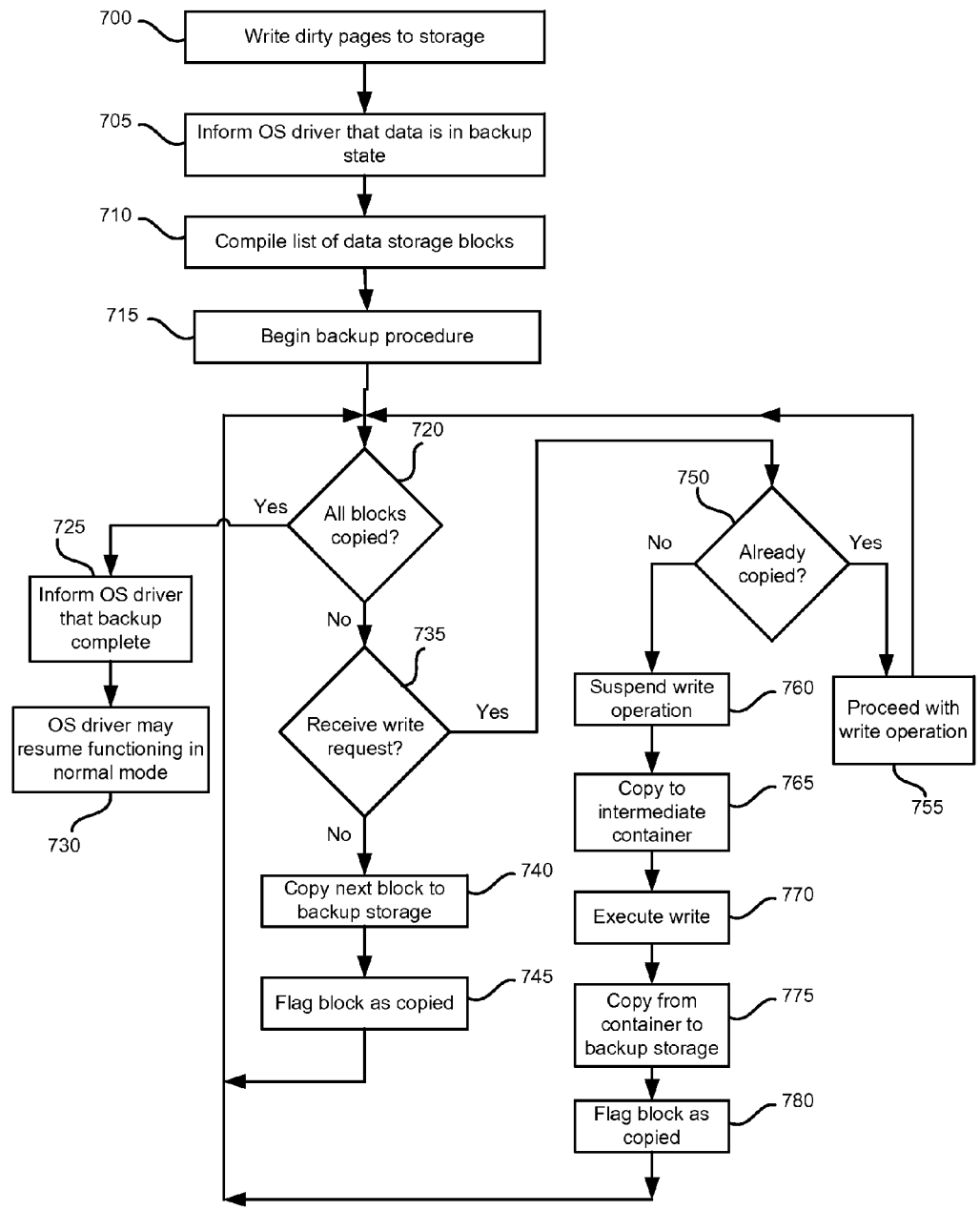
Figure 8:
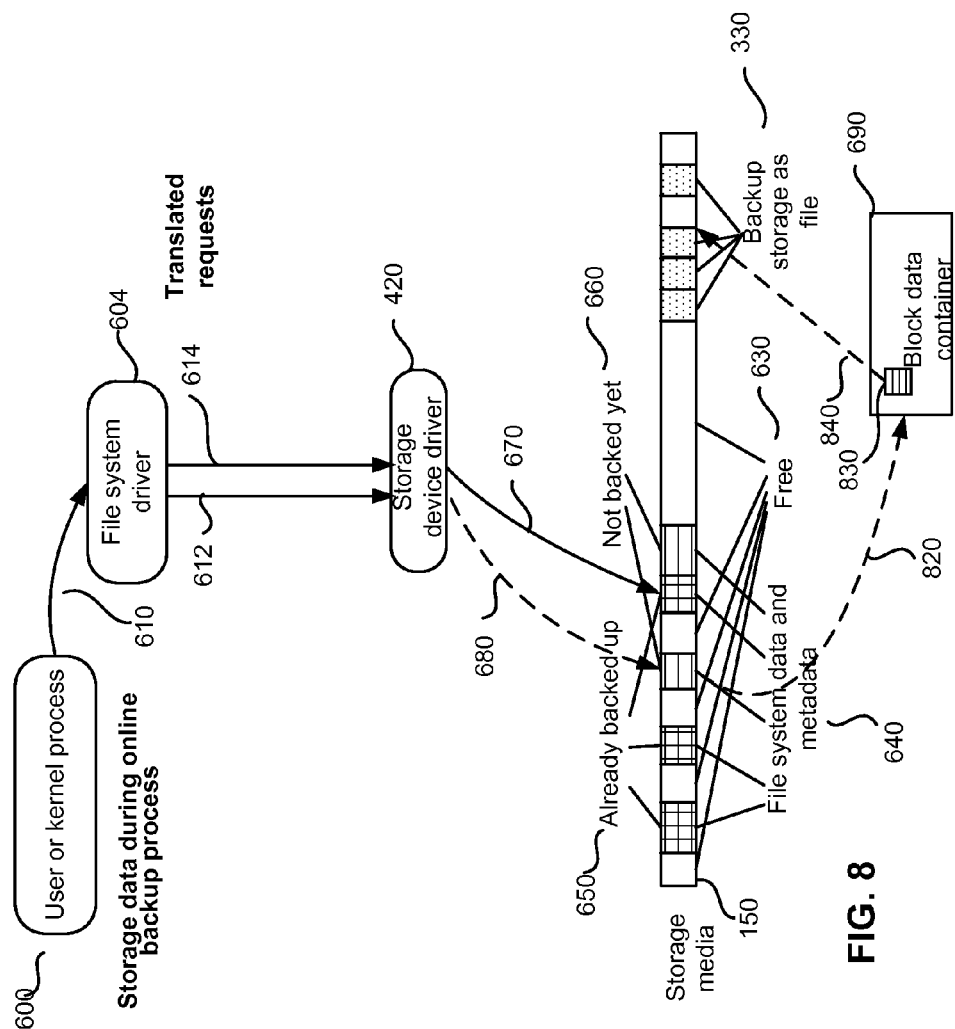
Figure 9:
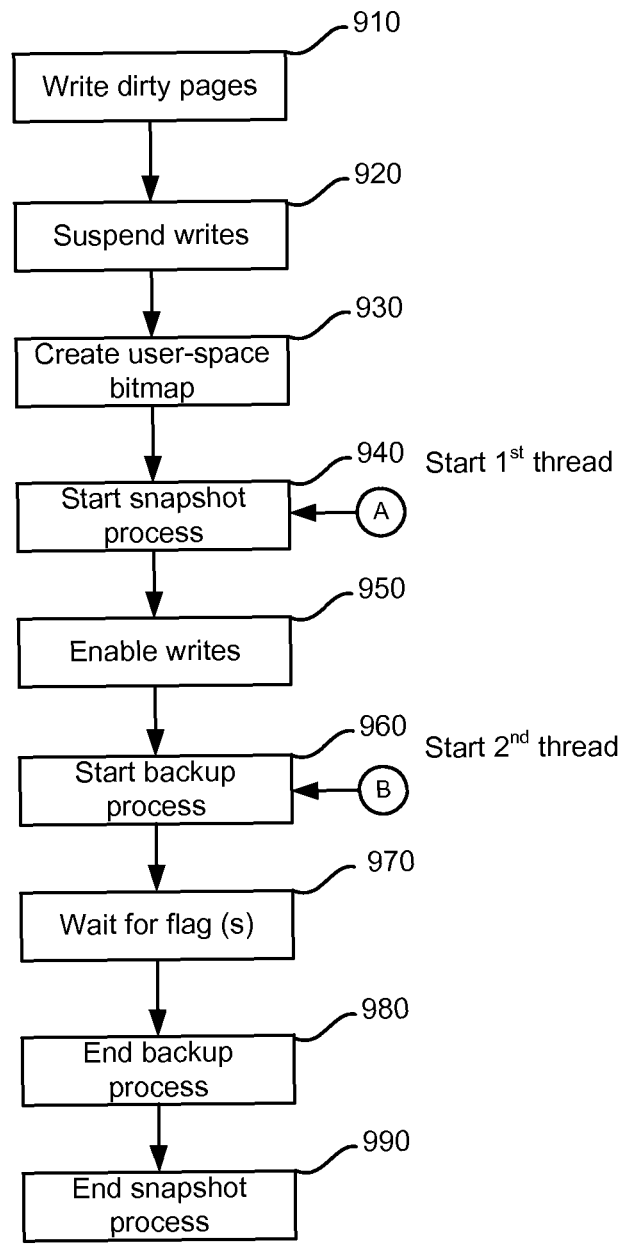
Figure 10:
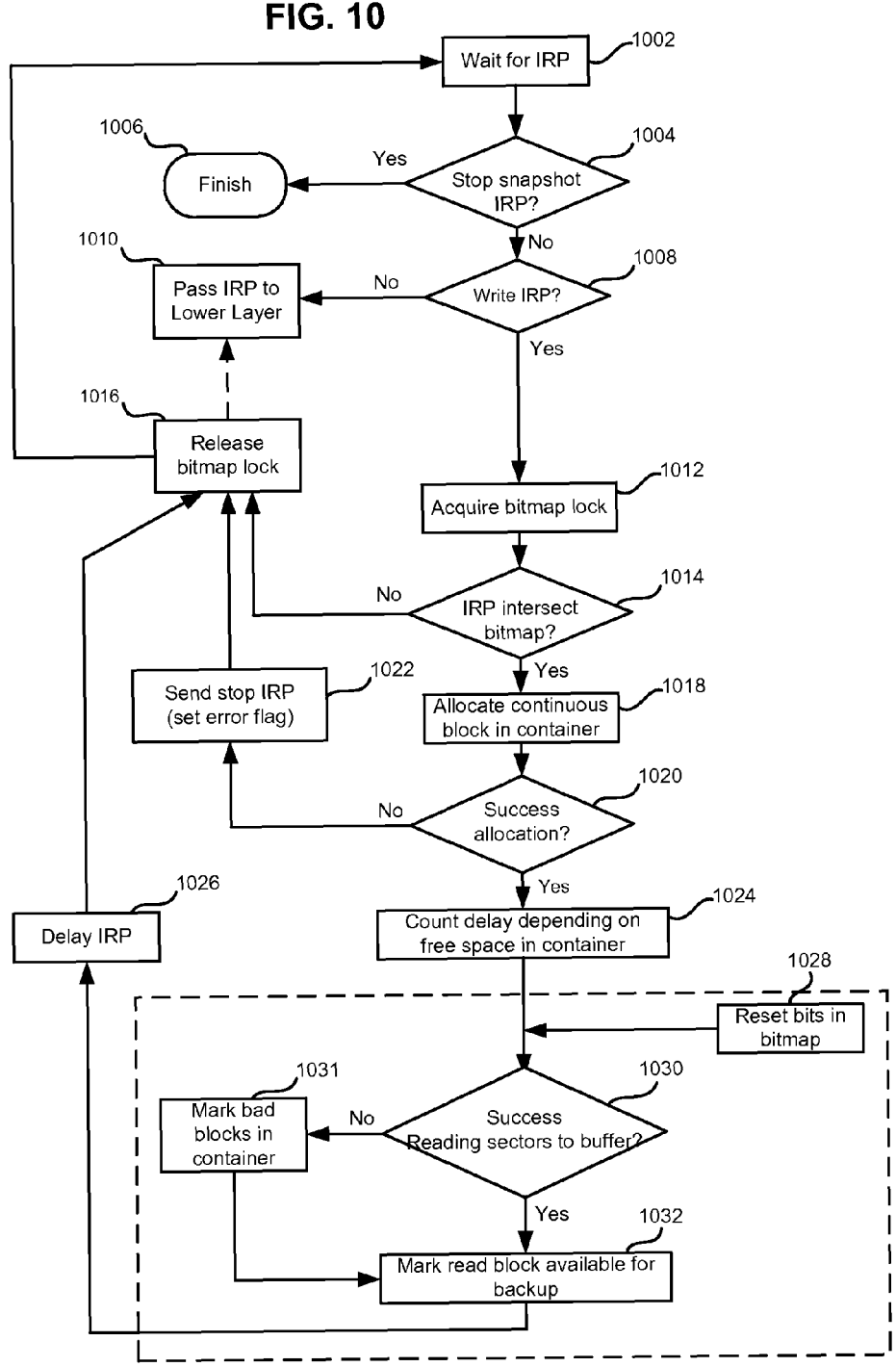
Figure 11:
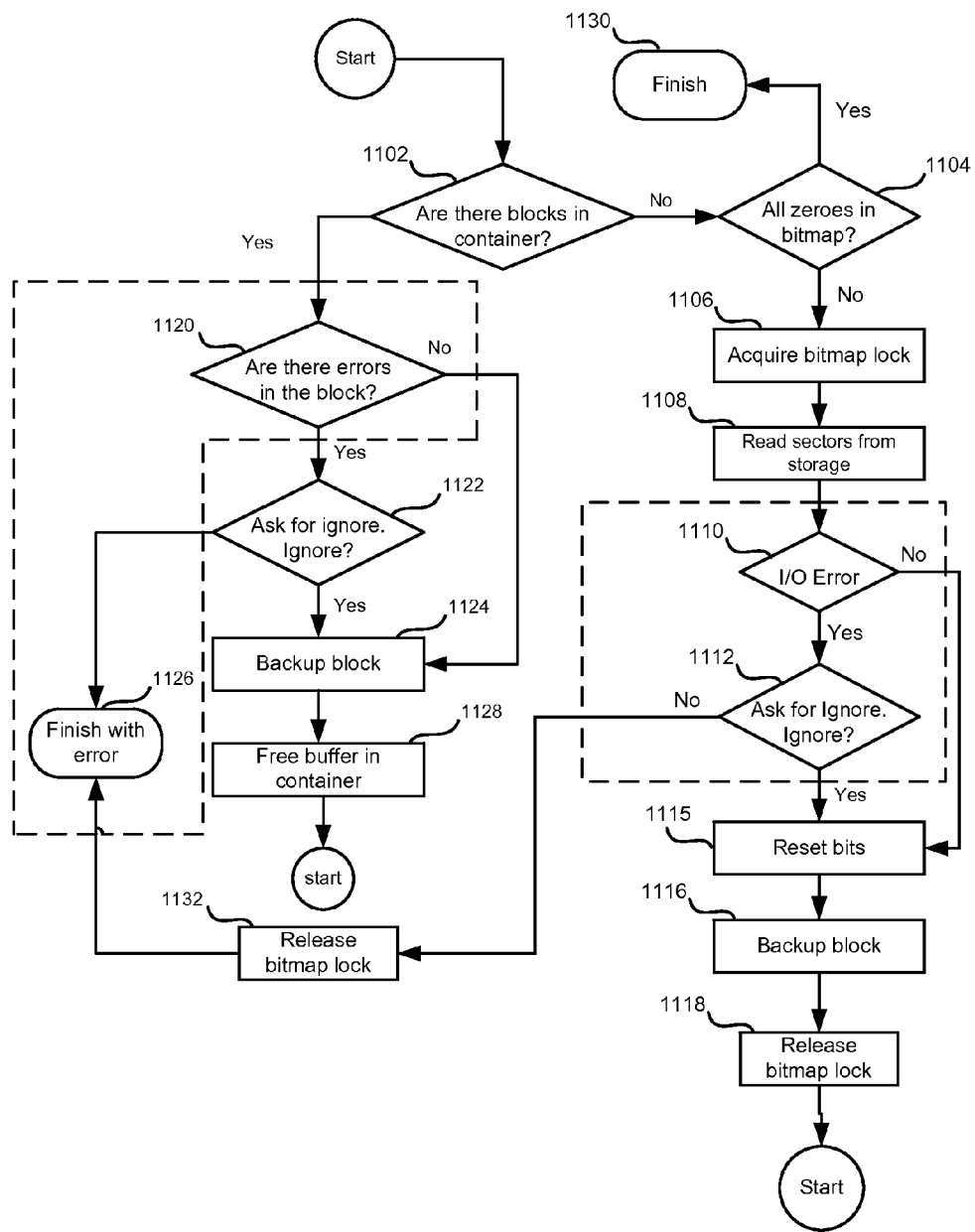
Figure 12:
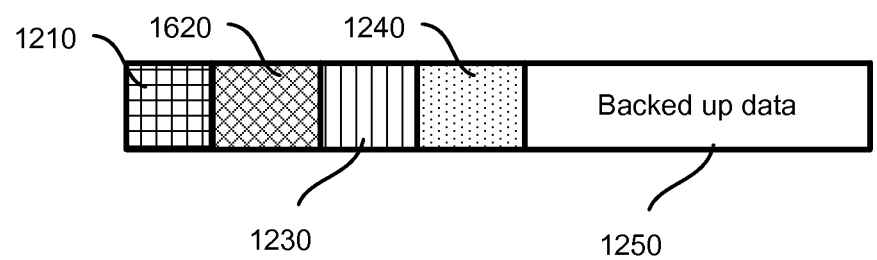
Figure 13:
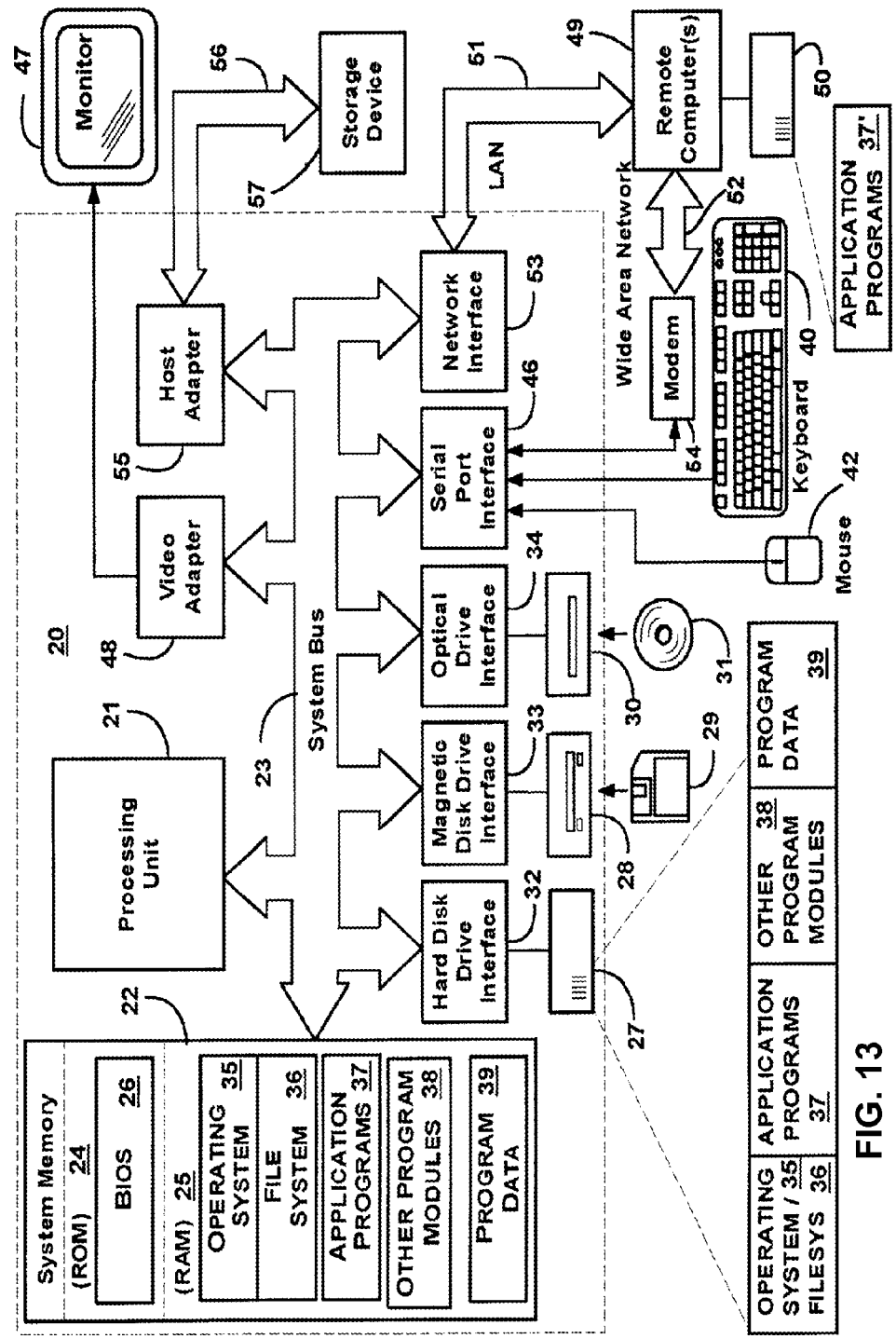

FIG. 5. illustrates redirection of a write request into a data block occupied by a backup file, in accordance with the exemplary embodiment;

FIG. 6 illustrates a backup system, in accordance with the exemplary embodiment;

FIG. 7 illustrates a flow chart of a method for online data backup, in accordance with the exemplary embodiment;

FIG. 8 shows an exemplary embodiment of the data backup process;

FIG. 9 illustrates a flowchart of a backup process, in accordance with one exemplary embodiment;

FIG. 10 illustrates a flow chart of snapshot generation process in accordance with the exemplary embodiment;

FIG. 11 illustrates a flow chart of a backup process using intermediate storage container, in accordance with the exemplary embodiment;

FIG. 12 illustrates an exemplary structure of a backup file;

FIG. 13 illustrates an exemplary computer system, on which the exemplary embodiments can be implemented.

DETAILED DESCRIPTION OF EMBODIMENTS OF THE INVENTION

Reference will now be made in detail to the embodiments of the present invention, examples of which are illustrated in the accompanying drawings.

A computer file system is located on a data storage device and interacts with the storage device at a block level. For example, read and write operations are performed on data areas that have sizes that are divisible by the size of an individual data block. The sequence of the data blocks in the storage is ordered, and each block has its own number. The computer system can include several such storage devices, and the file system can take only a portion of one such a storage, the whole storage, or several such storages or parts thereof. On a disk or a storage device, these types of storages are usually located in partitions, taking up the entire partition.

Figure 1:
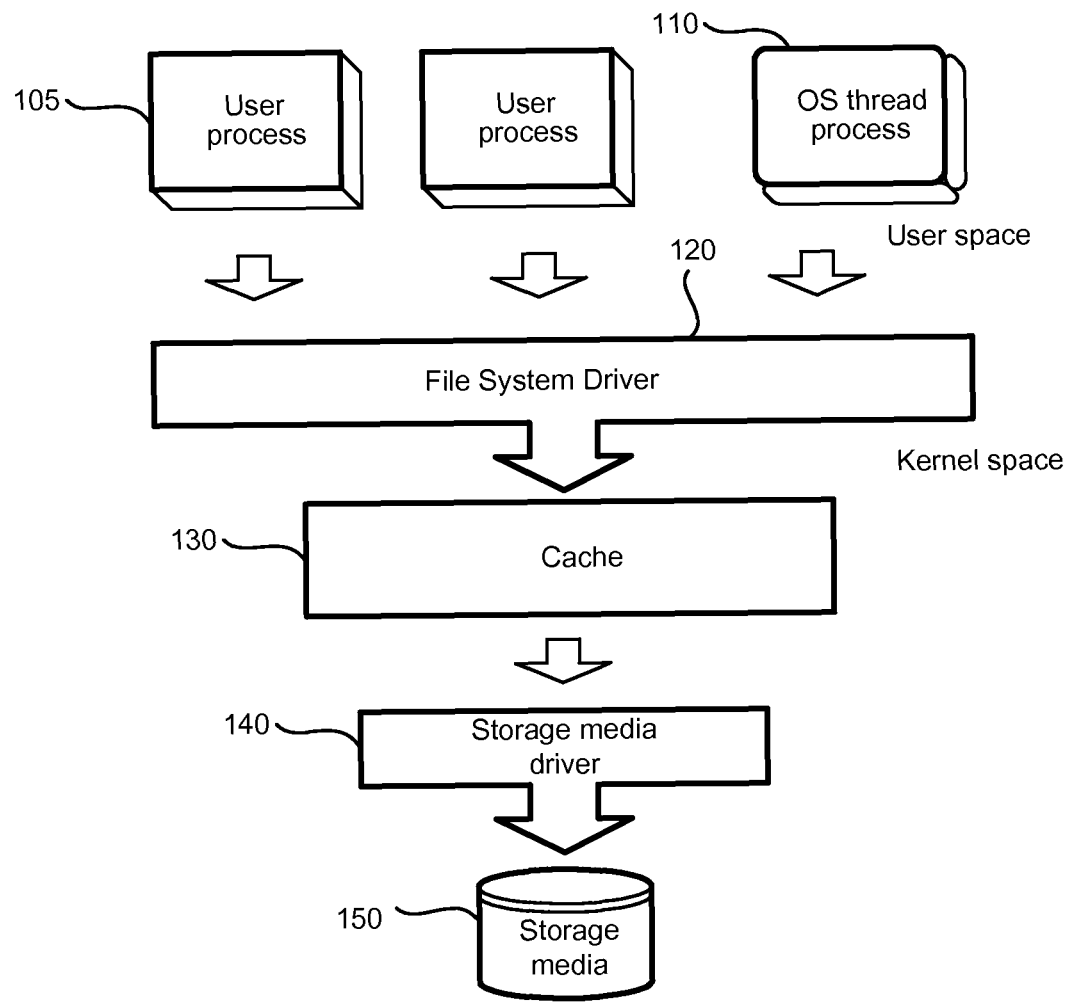
FIG. 1 illustrates processes and objects in a computer system in accordance with the exemplary embodiment.

According to an exemplary embodiment, the file systems can be subdivided into several categories, including a housekeeping data of the file system volume, a file metadata, a file data, and free space not occupied by any other data. A file system driver embedded into the operating system can provide services for the file system. FIG. 1 illustrates an exemplary processes and architecture of a computer system. The computer system includes a data storage device 150 accessible by one or more user processes 105 or OS thread processes 110. The user processes 105 or the OS thread processes 110 can request to read or write data to the storage media 150 via a file system request.

This read/write request can be directed to a file system driver 120, which defines where in the storage media the relevant data blocks are located. The request can then be directed (optionally) to the OS cache 130, where the requested data is currently cached. If the requested data is located in the OS cache 130, the system can complete the requested operation by allowing the user process 105 or the OS thread process 110 to perform a read/write operation on the cached data.

If the requested data is not located in the OS cache 130 or is otherwise unavailable (e.g., the space in the cache must be freed pursuant to an OS algorithm), the request is transmitted for execution to the OS storage media driver 140. The OS storage driver subsequently performs the requested operation on the selected data located in the storage media 150.

The OS storage driver 140 interacts with the storage media 150 in a block mode. Note that in the context of data management, a block is a group of records on a storage media. Blocks are typically manipulated as units. For example, a disk drive can read and write data in 512-byte blocks (or some multiple of 512). Accordingly, the OS storage driver 140 can receive read and write requests using blocks of the selected block size.

Each data block is associated with a number or a label corresponding to the type of the operation to be performed. Thus, the driver associated with the data write operation acquires a set of numerical pairs (e.g., a data block and a number) in order to process the data write command.

Figure 2:
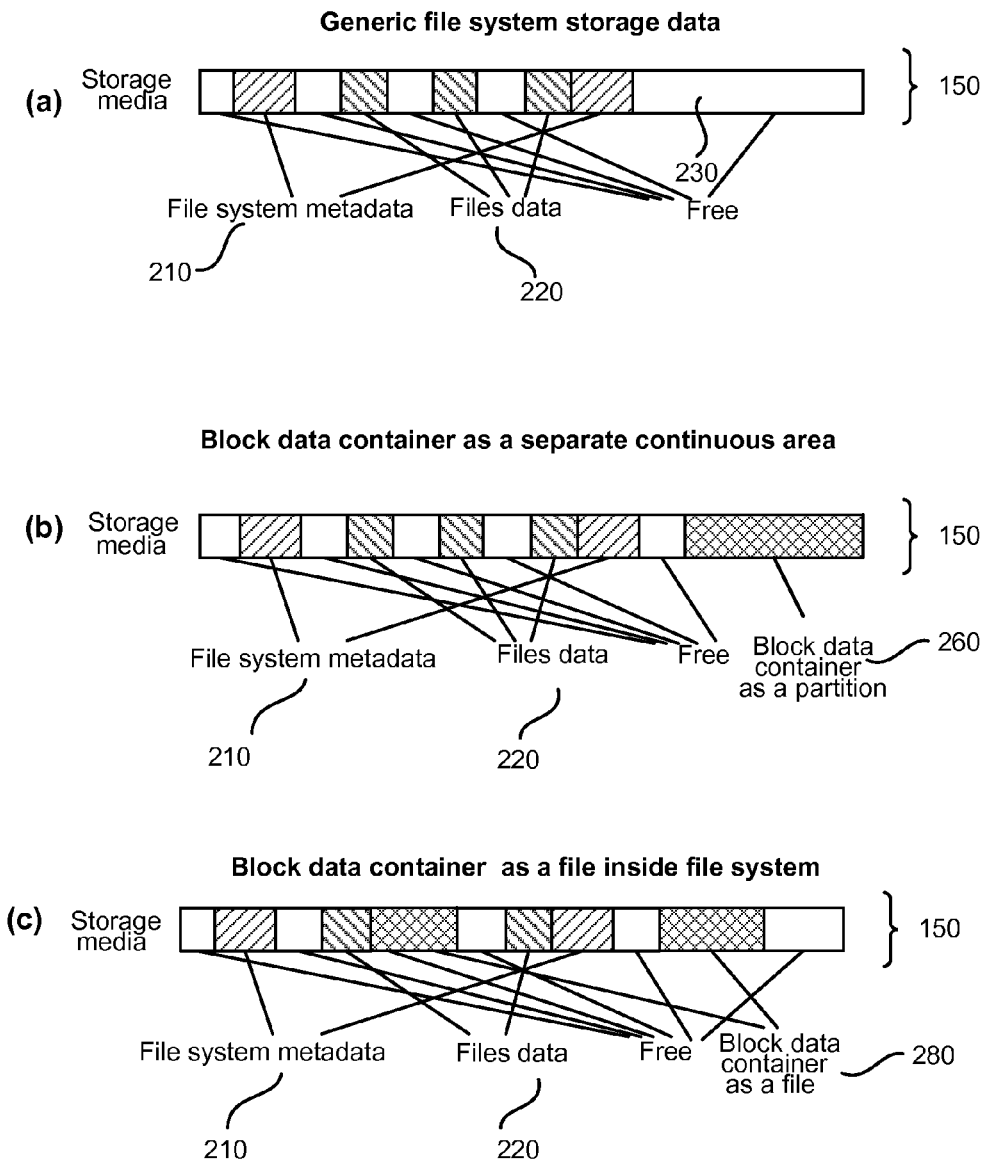
FIGS. 2A-2C illustrate exemplary embodiments of the system storage, including an intermediate data container for data backup, in accordance with the exemplary embodiment.

FIGS. 2A-2C illustrate exemplary embodiments of the system storage device. The storage media 150 is a file system storage data device or location. From the point of view of the file system, the blocks of data stored in the block data storage media 150 can be characterized into several different classes. Depending on the file system type, the storage media 150 can store data specific for the volume, metadata of the file system 210, file data 220, or free space 230 not currently taken by other data shown in FIG. 2A. Generally, a specific data type may be allocated to an entire data block and different data types cannot be combined into one block. However, under specific circumstances, the file system may combine different data units into one block (e.g., ReiserFS or Microsoft Windows NTFS).

Thus, by copying all data blocks that are not free (e.g., all blocks except for entirely free blocks 230), the system may obtain a file system snapshot that serves as a copy of a file system state at a current moment in time. Although listing the file system blocks is not a requirement, listing can be used to optimize the space used by the backup procedure. In the event this information cannot be acquired by the system, the block fetching procedure can be used to select all of the blocks associated with storing the file system data, including free blocks.

A data backup operation is a time consuming process. Thus, in order to conform backed up data with any specific state at a given moment the data being copied must not change before the backup operation is completed. Typically, this task is not difficult, if the data storage and the file system associated with the storage are not connected to any active computer or is otherwise blocked from data modification. Basically, the risk of nonconforming data is reduced if there are no processes capable of modifying the data.

The block data container (in this case, the block data container can be a file, or data blocks/clusters on the storage media) can be placed on the storage media as a part 260 of a storage media partition shown in FIG. 2B, or as a file 280 inside a file system on the storage media (FIG. 2C). Also, the block data container can be placed on the other storage media on the same server (for example, personal computer, workstation, storage server etc.), or the block data container can be connected via a network (such as, for example, LAN, SAN, NAS etc.).

Also, note that the block data container can be placed not only on one storage media (i.e., as a part of a storage media), and not only on one partition (i.e., volume). The block data container can be also placed on several partitions (i.e., volumes), or it can be placed in several files.

FIGS. 3A-3C illustrate exemplary embodiments of the system storage, including a backup storage implemented as file. The storage media 150 is a file system storage data device or location. From the point of view of the file system, the blocks of data stored in the block data storage media 150 can be characterized into several different classes.

The backup storage 330 (in this case, the backup storage can be a file, or data blocks/clusters on the storage media) can be placed on the storage media as a part of a storage media partition, or as a file inside a file system on the storage media 330-330B (in FIGS. 3B and 3C, respectively). In the beginning of a backup process, the backup file 330 can be (i.e., an empty file with an assigned name, for example, "backup.bbb"). Alternatively, the backup file 330 can contain service data or metadata with backup access data. According to the exemplary embodiment, the backup file 330 can be created with the service data as well as at least one backed up data block.

The backup file 330 can increase in size to 330A during backup process (i.e., backup of the data blocks). Note that after the backup process is completed, the backup file 330B can be increased in size due to beginning of a full or an incremental backup. However, a separate file can be created for each backup, for example, a file backup1.bbb. A separate map reflecting the blocks occupied by the backup file on the storage media 150 can be generated as well.

If the file system is connected to an active computer and there are file system processes and user applications working with data during the backup process (e.g., online backup), then the task becomes more complicated. An on-line backup is typical for servers with a high level of accessibility and therefore cannot be suspended to allow backup to be completed. For the on-line backup a snapshot of protected area can be created (which is described in U.S. application Ser. No. 10/624,858, entitled SYSTEM AND METHOD FOR USING FILE SYSTEM SNAPSHOTS FOR ONLINE DATA BACKUP, which is incorporated herein by reference), based on which basic (initial) backup can be created.

FIG. 3A shows the status of the data storage just after the backup process has been initiated. In order to optimize the backup process by increasing performance and reducing space requirements, the system will only copy the occupied areas 310 and not the free blocks 320.

During this process, as shown in FIG. 3B, the file system data subject to backup can remain in the two different states: (1) data 340 that is already backed up to the backup storage and (2) data 350 that is not yet backed up, but only scheduled for backup. When the backup is completed, as shown in FIG. 3C, all of the data is now located in the backup storage 330B, and the file system and the main data storage are subsequently ready for user operations and access.

Note that if the backup storage is implemented as a file, this file can get bigger as a number if the backed up files increases. The backup can be performed not into a single file but be distributed over a several files. Also, note that backup files of the storage media 150 can be saved into a directory instead of a file.

Files, directories and blocks or sectors of a storage media are vulnerable to corruption. For example, they can be infected by viruses or accidently removed or deleted. Therefore, in the exemplary embodiment, these files, directories and blocks located on the storage media are made protected from an outside access. They can only be accessed by an approved backup and recovery application. The exemplary embodiment, advantageously, allows for system recovery from the same disk/partition/volume where the data is stored.

Figure 4A:
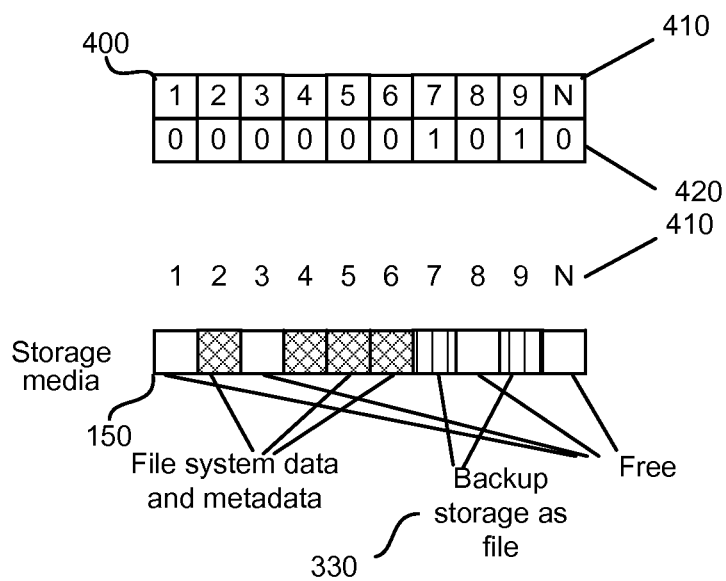
FIGS. 4A-4B illustrate exemplary maps of storage media data blocks occupied by the backup file.
Figure 4B:
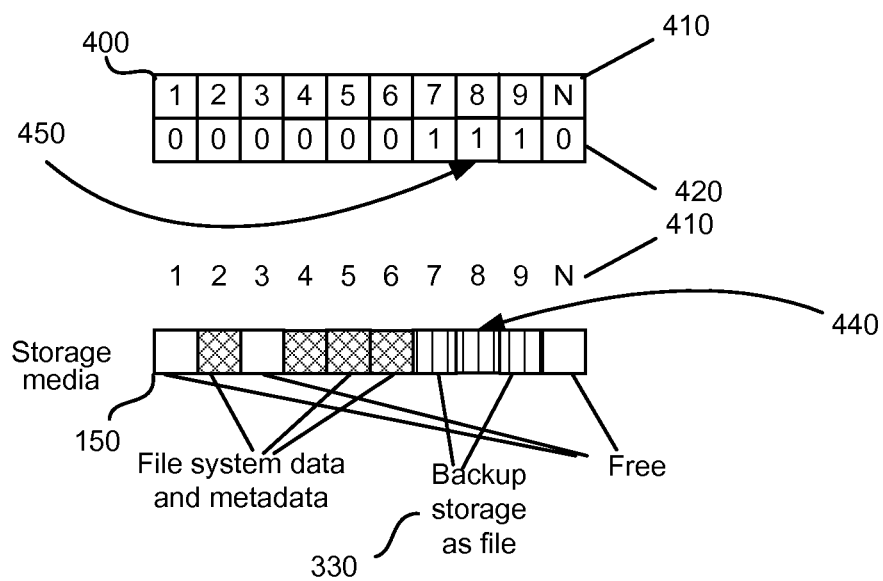

FIGS. 4A-4B illustrate exemplary maps of storage media data blocks occupied by the backup file. A map 400 reflecting the blocks 410 occupied by the backup file 330 on the storage media 150 is generated. As soon as a newly backed up data block 440 is added to the backup file 330, the backup file 330 increases in size and occupies at least one data block on the storage media 150. The backed up block 440 that now belongs to the backup file 330 is marked in the map 400 by binary numbers 420. For example, an occupied block can be marked by "1"—450 (FIG. 4B).

Note that a data block (on the storage as well as on the backup) can be a part of a file, one or more sectors of the hard disk or another distinct portion of data that can be stored on the storage media. A directory with the same properties as a backup file can be used instead of this file. Such directory has its own map and is protected from any access except for access by the backup/restore application.

Also note that the storage media 150 can contain at least one data block (the data block can represent a sector of the hard disk or several sectors) that does not belong to the backup file, but related to it. This data block can contain service data related to the backup. For example, the service data can reflect location of the occupation map or data reflecting location and numbers of the data blocks/sectors of the storage media that belong to the backup file. The service data block is also marked in the map as a block occupied by the backup.

The service data block can, for example be references as "Backup_block_map_location of map". The string can also contain data blocks occupied by the map file or a first block occupied by the map file. Thus, this block is used for determining map location and/or data blocks occupied by the backup file and/or data blocks occupied by the map file if the map is included into the backup file. The service data block allows for recovering data from the backup based on the service data.

The service data blocks can be duplicated on the storage media in order to increase security and fault tolerance. A duplicate data block is also marked in the map as backup block that is protected from (write and/or read) access. According to the exemplary embodiment, the map can be a part of the backup file or it can be stored separately on the storage media. Alternatively, the map can be located in the backup file and copy of the map can be stored separately from the backup file, for example, as a file located on the storage media.

The map file is not visible same as the backup file. The blocks occupied by the map file are marked in the map itself. These blocks cannot be modified by the user or application except for the backup/restore utility. The map file (or the map within the backup file) can begin with the service data that allows the backup/restore application to identify the map. For example, the map file can begin with a string "Backup_restoration_map_for_data_blocks", followed by the actual map or a list of numbers of the occupied data blocks and numbers of the data blocks occupied by the map file or by the map itself including the data blocks sequence.

The sequence of the map data blocks is used for correct reading of the map. However, the map data blocks sequence is optional, since each map data block contains a certain amount of the numbers of the data blocks belonging to the backup file. Generally, the string "Backup_restoration_map_for_data_blocks" indicates that the map starts here. The map can be found by the backup/restore application as well as manually by any application that allows viewing contents of the files or data blocks. In this case, a file system driver and/or storage media driver that allows viewing a hidden backup file or service data blocks or the map is required.

FIG. 5. illustrates redirection of a write request into a data block occupied by a backup file (or to a service data block), in accordance with the exemplary embodiment. The data block occupied by backup and the service data block are marked in the map. Therefore, a write request needs to be redirected to a different area of the storage media that is free and accessible for write operations.

Initially, a user process or a file system process 600, such as, for example, a disk cache, issues a write request 610 to the data storage that is received by the file system driver 604. In response to the write request 610, the file system driver 604 transmits translated requests 612, 614 and 616 (such as writing data to data storage device sectors from n to n+m, for example, from 120 to 150 sectors) to the storage device driver 620.

In response to the requests 612, 614 and 616, the storage device driver 620 transmits modification requests 670, 680 and 686, to the appropriate storage area, to free space on the storage media 630 or to an area 330 occupied by the backup. This process is described in more detail below.

After the storage device driver 620, translates modification requests 612, 614 and 616 to requests 670, 680 and 690, these requests are directed to the appropriate storage area or to a free space on the storage media. At this point a filter 662 intercepts modification requests 612, 614 and 616 and checks in the map 400 (process 646) for marked data blocks/sectors/clusters belonging to the backup 330 that need to be modified.

If the modification request is directed to a free space 630 on the storage media 150, then this request can be executed. However, if the modification request 686 is directed to sectors occupied by the backup file 330 (i.e., a data block 86 is marked in the map 400 as belonging to the backup 330—bit "1" is set), then the modification request 686 is redirected to another area of the storage media 150, for example to the free area 630.

Note that redirection of the modification request 686 to another area of the storage media 150 can be performed by the storage device driver 620. The storage device driver 620 needs to be informed that the given data block is occupied and cannot be written to, and that another area needs to be selected. Alternatively, redirection of the modification request to another area of the storage media can be implemented by an additional storage device driver. In this case, after the data is written into a free area 630, a storage device driver 620 needs to be provided with an address to where the data was written according to the request 686.

The backup file 330 can be hidden from the file system driver 604 and/or from the storage device driver 620. So if a file is hidden from the file system, then the file system driver 604 does not know anything about the file 330 and/or the storage device driver 620 does not know where (i.e., in which sectors of the storage media 630) the backup file data is located. Since the storage device driver 620 does not know locations of data of the backup file 330, it considers the sectors occupied by the backup file to be empty and can write some data according to the modification requests into them. Therefore, redirection 690 of the modification requests 686 is performed to a free area of the storage media 630.

FIG. 6 illustrates a backup system, in accordance with the exemplary embodiment. For the purposes of illustration, the following example assumes that the backup process for the data of the storage media 150 is launched such that the backup process may be performed within the off-line backup procedure.

Initially, a user process or a file system process 600 (such as, for example, a disk cache) issues a write request 610 to the data storage that is received by the file system driver 604. In response to the write request 610, the file system driver 604 transmits translated modification requests 612 and 614 (such as writing data to data storage device sectors from n to n+m, for example, from 120 to 150 sectors) to the storage device driver 620.

In response to the modification requests 612 and 614, the storage device driver 420 transmits modification requests 670 and 680, to the appropriate stored data or to free space on the storage media 150. This process is described further below. Also note that the backup can be performed on a file-level or on a block-level.

Accordingly, the modification process may request the data 650 that has already been copied to the backup file 330 (i.e., request 670) or data 660 that has not yet been copied or backed up (i.e., request 680). The request 670 can be performed without damaging the backed up data, because the backup is a one-pass process that does not require a return to block of the storage device, which have already been backed up.

Also, note that write request to a free space 630 of a storage media 150 can be performed without any limitations. But, in conventional systems, request 680 cannot be performed because the integrity of the backed up data can be adversely affected. For example, a modified block that does not belong to the given copy can penetrate into the backup copy. This can make the correct recovery of the file system state impossible, because data may refer to different points in time. As a result, the integrity of the data would be compromised.

In this example, the modification requests 670 and 680 are directed to data that is subject to the backup process. To solve this problem, one exemplary embodiment of the present invention includes a temporary data storage container 690 designed to address the situations discussed above and utilizes a method of data backing up into a backup storage, described below The backup procedure described here operates at the level of the underlying file system and may be implemented with a file system based on a block storage principle. The exemplary embodiment includes a procedure to define the data and metadata of the file system by a number of the block to which the subject data belongs. For internal purposes, the backup procedure efficiently defines which blocks have been copied or are subject to being copied.

As discussed above, the intermediate data storage container 690 can be any storage device suitable for storing data. For example, intermediate data storage 690 can be a temporary buffer based on the block design of the storage media 630. Intermediate data storage container 690 can be a memory located external to the backed up storage media 630 space. Alternatively, or in addition, intermediate data storage container 690 can be placed in a dedicated part of the storage media 630 space, which can represent a separate partition of the storage or as a file within the file system that has been reserved for the purpose of providing a temporary data storage container.

FIG. 7 illustrates a flow chart of a method for online data backup, in accordance with the exemplary embodiment. The on-line backup procedure of the present invention begins with the step of informing the operating system driver responsible for servicing the data storage that the data is in the backup state, shown at step 705.

In an alternative embodiment, the system can call an operating system cache reset procedure to write "dirty" pages into the data storage before informing the operating system driver about the initiation of the backup process, as shown at step 700. This procedure increases the current-ness of the data stored in the snapshot. After the system has informed the operating system driver, the system then compiles the list of data storage blocks at step 710.

This list contains the file system data of different types that should be backed up during the backup process. Once the list has been generated, the backup procedure begins at step 715. Until the system reaches the end of the list (see step 720) or receives a write request (see step 735), the system goes down the list and copies the blocks into the backup storage at step 740.

Upon completion of each block backup, the block is flagged or marked as backed up in step 745. The blocks remain unchanged during the backup process. When the last block is backed up or the backup procedure is canceled, then in step 725, the OS driver servicing the data storage is informed that the backup procedure is completed and the driver continues functioning in a normal mode in step 730. Note that cancellation can be induced by the fatal errors, by a user's decision or by the processes of the operating system.

The OS driver servicing the data storage is able to communicate with system agents running the backup procedure. Once the backup procedure is initiated, this driver provides the backup procedure with the data block numbers that have been requested for write into the data storage by the operating system or a user process.

The backup procedure, depending on the state of its internal data, may be responsible for determining whether or not each requested block has been copied to the backup storage. If the block has not been copied, then the OS driver suspends the block write and waits until the block is copied and subsequently released.

In one exemplary embodiment, the requested block can be released by continuing the backup procedure (e.g., when the requested block is the next block in the backup sequence). However, the request processing time can be very long and usually this type of mode is unacceptable for online systems.

In step 750, the system determines if the requested block is already copied. If the block is copied the system proceeds with write operation in step 755. If the block has not been copied, the write operation is suspended in step 760. The block is copied to an intermediate container in step 765 and the write operation is executed in step 770. Then the block is copied from the intermediate container to the backup storage in step 775. The block is flagged as copied in step 780.

In another exemplary embodiment, the block release may be performed in connection with a specific container used as intermediate data storage. FIG. 8 shows an exemplary embodiment of the present invention in which the system utilizes a block data container to manage the block release process. When the data storage driver receives a request to write a block into the area already copied by the backup procedure 650, the required write is performed without limitations (as shown at step 755 in FIG. 7).

However, if the incoming write request 680 is directed to an area not yet backed-up, then the write process can be suspended and the current state of the given data area is copied to the intermediate data storage container 690, as shown at 820 in FIG. 8 (and shown as steps 760 and 765 in FIG. 7). When the copy procedure is completed, the system will allow the write procedure 680 to be executed (step 770 in FIG. 7). Thus, the content of the data block 830, at the moment the backup procedure commenced is stored in the intermediate block container 690.

The content 830 is copied from the container 690 by the backup procedure 840 (step 775 in FIG. 7). The block is flagged (step 780 in FIG. 7) and the backup process continues. Note that the write procedure (step 770) can be executed in parallel with the process of copying data from the intermediate block container to the backup storage (step 775 in FIG. 7). Accordingly, the system need not wait until the original write operation is complete to initiate the backup copy operation.

Moreover, the step of writing the content of the intermediate block container 690 into the backup storage 330 can be performed in a substantially asynchronous manner (e.g., it is not necessary to wait until the intermediate block container 690 is flushed to process the next incoming block write request, if the container 690 has not over-flowed). Thus, the delays that result from writing to the main storage are reduced to a minimum, and the programs running on the computers that use the data storage can continue working substantially without any pauses.

If, during the write process to the intermediate block data container 690, the container overflows, then the data write processes to the unsaved area of the main storage device should be suspended. In addition, the temporary data, via a write process, in the intermediate block data container should be written to the backup storage 330 in order to free up space for further storage.

But, if the pending write requests are directed to the data in the main data storage (storage media) 150 that have already been copied, then the execution of these write requests does not need to be stopped. Note that it is not necessary to flush the container 690 completely into the backup storage 330. Generally, it is sufficient to partially free the container 690 to allow a suspended process to be resumed as soon as possible.

FIG. 9 illustrates a flowchart of a backup process, in accordance with one exemplary embodiment. As shown in FIG. 9, the continuous data protection process is implemented. Note that the snapshot process may run asynchronously. In other words, once the continuous data protection process is launched, it can proceed in a separate thread, asynchronously relative to the process illustrated on FIG. 7.

After the write file request is received, data blocks, which must be written based on the write file request, are backed up to the incremental backup. The "dirty pages" are written from the cache to storage (step 910). The "dirty pages" are pages in an OS cache that contain information to be written into a storage device, but that have not been written due to an OS policy or other OS mechanisms (for example, a "lazy write" approach used in some modern OS's).

The next step 920 suspends write operations. These suspended write operations are added to a special list, and a parameter is returned to the operating system, informing the operating system that these write operations have a "pending" status. In other words, the operating system will know that the write command execution has been postponed until later.

In step 930, a user-space bitmap is created. The operating system drivers are not involved in the creation of the bitmap. Rather, the storage medium (for example, a disk drive) is read directly, the file system structure is identified, and the data blocks that are being used are identified. It should be noted that although in the exemplary embodiment the bitmap is created on a data block level, it is possible that the bitmap build procedure is related to file system reflection into block space of the storage device, and considers only non-utilized blocks (vs. free blocks).

Thus, those data blocks that are being used are tagged with, for example, a "1" in the bitmap, and those that are not used are tagged as "0" in the bitmap. Note that the size of the data block can be relatively large. For example, it may be larger than a typical sector in a hard disk drive. In other words, as discussed further below, there may be a need for a further step that determines which part of the data block is actually being used, if the data block is relatively large. Also, note that the values used in the bitmap can be not only binary "0" and "1". As another option, the bitmap can be used to store information about bad blocks. Note also that the bitmap can be created and managed in user space, or, alternatively, in OS kernel space.

In step 940, the snapshot process begins, typically by initiating a thread, designated by A. Note that the snapshot process can run asynchronously. In other words, once the snapshot process is launched, it can proceed in a separate thread, asynchronously relative to the process illustrated in FIG. 7.

In step 950, the write operations are enabled. In step 960, the backup process designated by B is started. Note that the process B is also in asynchronous process, usually implemented as a thread. Also, note that processes A and B can be either synchronous or (preferably) asynchronous relative to each other. Synchronization can be performed using access to the bitmap as a serialization mechanism. The serialization mechanism ensures that two concurrently-executing threads or processes do not execute specific portions of a program at the same time. If one process has begun to execute a serialized portion of the program, any other process trying to execute this portion must wait until the first process finishes. Synchronization is used to control access to state both in small-scale multiprocessing systems—in multithreaded and multiprocessor computers—and in distributed computers consisting of thousands of units—in banking and database systems, in web servers, and so on.

In step 970 the system waits for a flag and once the flag is received the backup process is completed in step 980, the snapshot process A can end in step 990.

FIG. 10 illustrates a flow chart of snapshot generation process in accordance with the exemplary embodiment. In step 1002, the snapshot process waits for the interrupt request packet (IRP). Note that the IRP sometimes goes by different names, but, in general, is a request to the OS kernel to perform some action relating to the storage device, such as a write or a read on the storage device.

Once the IRP is received, the IRP is analyzed. If the IRP is a stop-snapshot type IRP (step 1004), then the process terminates (step 1006). If it is not a stop-snapshot IRP, then, in step 1008, the snapshot process checks if this is a write IRP. If it is, then in step 1012, the process acquires a bitmap lock. In other words, in step 1012, the bitmap is locked, and cannot be altered during the snapshot process. If it is not a write IRP, then in step 1010, the IRP is passed to a lower layer (e.g., to the hardware layer of the local HDD) to be performed by the OS in a normal manner.

In step 1014, the process checks if the IRP corresponds to any bits in the bitmap that have been flagged as a used block (with a "1," for example). If not, then the process proceeds to step 1016, releasing the bitmap lock. Otherwise, in step 1018, in the intermediate block container, a space is allocated, such that the space is equal to the amount of data that needs to be stored there.

Successful allocation is then checked in step 1020. If the allocation has not been successful, an error flag is set in step 1022, and the process returns to step 1016. The bitmap lock released in step 1016 and operation can either continue to step 1002 or pass the IRP to the lower layer (step 1010). If the allocation in step 1020 has been successful, then a counter to be used in the delay procedure is calculated/recalculated, depending on the amount of free space in the container (step 1024).

Meanwhile, the bits in the bitmap are reset in step 1023, and data from the intermediate storage container is read. If the data has been read successfully (step 1030), the block that is available for backup is marked in step 1032, otherwise, the block is marked as a "bad" block in the container in step 1031. After step 1031, the process proceeds to step 1032 where a block that is available for backup is marked. Note that the IRP can be delayed (step 1026), for example, by using a counter. Note that the delay process 1026 can influence the counter value as well.

FIG. 11 illustrates a flow chart of a backup process using an intermediate storage container, in accordance with the exemplary embodiment. In step 1102, the process checks if there are any blocks in the intermediate storage container already. If there are none, then in step 1104, the process checks if the bitmap contains only zeros or does not contain used blocks (note that depending upon implementation, the bitmap can contain bad block marks as well).

If "Yes", then the process ends in step 1130. If "No," the process proceeds to step 1006, which acquires the bitmap lock. Information about a sector from the bitmap in step 1102 is used to address backup procedure to the sector. The sectors are read from storage in step 1108, such that the sector corresponds to the flagged bits in a bitmap. In step 1110, if there are no I/O errors, the process proceeds to step 1114, which resets the bits. In case of error, the system asks for user action in step 1112, for example, by creation of a dialog box on the console (e.g., by asking the user: "Error reading disk data. Cancel operation or ignore error?").

Alternatively, the response regarding the action to be taken can be received "in advance" by specifying some pre-defined error recovery policy. In other words, the error is not ignored, but the bitmap acquired in step 1106 is released, and the process is finished (with error). Then in step 1115, the system resets appropriate bits in the bitmap. In step 1116, the block is backed up, and in step 1118, the bitmap lock is released.

In step 1110, if there is an failure, (in other words, the particular sector cannot be read), then an error is generated, and an error handling routine 1112 is triggered. For example, interactive input from the user may be requested, or a pre-defined error handling approach may be used. If the received response indicates that the error cannot be ignored, the system finishes operation (step 1126).

In step 1112, if there is no "ignore," the bitmap lock is released (step 1132), and the process finishes with error (step 1126). In step 1102, if there are copied blocks in the container, the system proceeds with backing it to the backup storage. But, in case of errors in the block (see 1120), the system asks the user (or checks a predefined policy) whether it should ignore the error (step 1122). If, in case of error, the error handling routine in 1122 returns a request to ignore the error, then the block is backed up (step 1124), and a buffer in the container is freed (step 1128). The process can then return back to step 1102. Otherwise, in step 1122, the process finishes with an error (step 1126), as described above.

FIG. 12 illustrates an exemplary structure of a backup file. The backup file 330 contains a service data block 1210. Note that when the backup storage implemented as a file, the file can increase as a number of backed up files increases. A service data block 1210 contains service data related to the backup such as map location 1230 of the data blocks occupied by the backup or location and numbers of blocks/sectors occupied by the backup. The service data block is marked in the map.

The service data block can, for example be references as "Backup_block_map_location of map". The string can also contain data blocks occupied by the map file or a first block occupied by the map file. Thus, this block is used for determining map location and/or data blocks occupied by the backup file and/or data blocks occupied by the map file if the map is included into the backup file. The service data block allows for recovering data from the backup based on the service data.

The service data blocks can be duplicated on the storage media in order to increase security. A duplicate data block is also marked in the map as backup block that is protected from access. According to the exemplary embodiment, the map can be a part of the backup file or it can be stored separately on the storage media. Alternatively, the map can be located in the backup file and copy of the map can be stored separately from the backup file, for example, as a file located on the storage media.

The backup file 330 can contain backup metadata 1220. The backup metadata 1220 contains backup-related information—time of creation, backup number, type of the backup (i.e., incremental, full or differential), and locations of data blocks within the backup file. The metadata 1220 can also contain information about backed up storage media, for example, which sector/partition (C:, D:, etc.) have been backed up, partition size, storage media size as well as other backup-related information needed for recovery and consolidation operations.

The map file is not visible, the same as the backup file. The blocks occupied by the map file are marked in the map itself. These blocks cannot be modified by any user or application, except for the backup/restore utility. The map file (or the map within the backup file) can begin with the service data that allows the backup/restore application to identify the map.

For example, the map file can begin with a string "Backup_restoration_map_for_data_blocks", followed by the actual map or a list of numbers of the occupied data blocks and numbers of the data blocks occupied by the map file or by the map itself including the data blocks sequence.

The sequence of the map data blocks is used for correct reading of the map. However, the map data blocks sequence is optional, since each map data block contains a certain amount of the numbers of the data blocks belonging to the backup file. Generally, the string "Backup_restoration_map_for_data_blocks" indicates that the map starts here. The map can be found by the backup/restore application as well as manually by any application that allows viewing contents of the files or data blocks. In this case, a file system driver and/or storage media driver that allows viewing a hidden backup file or service data blocks or the map is required.

The backup file can contain a bitmap of the backed up data blocks 1250. The bitmap 1240 is a user space bitmap created without the operating system drivers. Rather, the storage medium (for example, a disk drive) is read directly, the file system structure is identified, and the data blocks that are being used are identified.

It should be noted that although in the exemplary embodiment the bitmap is created on a data block level, it is possible that the bitmap build procedure is related to file system reflection into block space of the storage device, and considers only non-utilized blocks (vs. free blocks). An alternative embodiment creates a bitmap for clusters of blocks or for large structures being backed up as integral structures.

Thus, those data blocks that are being used are tagged with, for example, a "1" in the bitmap, and those that are not used are tagged as "0" in the bitmap. Note that the size of the data block can be relatively large. For example, it may be larger than a typical block or sector in a hard disk drive. In other words, there may be a need for a further step that determines which part of the data block is actually being used, if the data block is relatively large. Note that the values used in the bitmap can be not only binary "0" and "1". As another option, for example, the bitmap can be used to store information about bad blocks. Note also that the bitmap can be created and managed in user space, or, alternatively, in OS kernel space.

Thus, the bitmap 1040 is generated by the user space module, the bitmap 1040 defines backed up data blocks of the storage media, contains numbers of blocks and their locations on the storage media. It can also contain locations of the data blocks within the backup itself. For additional detail, see U.S. patent application Ser. No. 11/459,978, Filed: Jul. 26, 2006; U.S. patent application Ser. No. 11/382,851; Filed: May 11, 2006, entitled SYSTEM AND METHOD FOR USING FILE SYSTEM SNAPSHOTS FOR ONLINE DATA BACKUP; U.S. patent application Ser. No. 10/925,928, filed Aug. 26, 2004, entitled SYSTEM AND METHOD FOR USING FILE SYSTEM SNAPSHOTS FOR ONLINE DATA BACKUP and U.S. patent application Ser. No. 10/624,858, filed Jul. 22, 2003, entitled SYSTEM AND METHOD FOR USING FILE SYSTEM SNAPSHOTS FOR ONLINE DATA BACKUP, incorporated herein by reference in their entirety.

The backup also contains the backed up data blocks 1250 that are referenced in the bitmap 1240.

The backup can also contain a file system, such as FAT, NTFS, which can be full-featured file system, or a more limited one. The purpose of the file system in the backup itself is being able to access data within the backup and being able to search for data that belongs to a particular file, or to a particular backup.

This is particularly useful if the file system becomes damaged, or if the File Allocation Table or MFT, the ability to load a file or read a file from the storage medium is impossible.

In this case, when files are not accessible on the storage device, the use of a loader disk and recovery software permits identification of specific data blocks within the backup, for example, by using the service data block, as described above.

After that, since the backup file includes its own file system, it is possible to read the relevant recovery data and write it to some other storage device or to another partition, since the file system in the backup permits identifying the location of each data block and which file it is associated with.

If data is restored to the same storage device, there are several options. For example, it is possible to move the restored data to the beginning of the storage device, the end, some other specific location, and also to create a partition on the storage device that does not overlap the recovered data. After the partition is created, the remaining data can be restored to that partition (or all the data can be restored to that partition). The backup file can remain in place, or can be moved or copied to the new partition, and another partition can be created where the backup file used to be.

A similar procedure can take place with an entirely different storage device.

If some data block in the backup is damaged, the backup data can be restored on a file-by-file basis, or all the non-damaged blocks can be restored, and then the integrity of the entire backup can be performed.

As yet a further option, the hidden backup can be stored as a special file, which is nominally part of the operating system's file system. However, access the special file is only permitted through a driver specifically dedicated to such a purpose. Normally, other drivers are not aware of the existence of the dedicated driver, but the dedicated driver permits the backup software to use other drivers and the standard file system, as needed, as if the dedicated driver does not exist. Thus, the only application that normally would have access to the file through the special driver, is the backup software. Normally, the special file is otherwise invisible, and even though it takes up space on the hard disk drive, the operating system, optionally, is not aware of the fact that the space is taken up, and the total available space on the disk is shown as if the special file does not exist. As yet another option, the size of the special file is subtracted from the available space. In either case, the backup software needs to insure that the special file is not overwritten by the regular file system.

Furthermore, the special backup file can store additional metadata, compared to metadata normally associated with files, such as the regular file system's file names, time stamps, file size, and other similar information. Specifically, the backup and the special file can also store sector by sector addresses of the data that is backed up, to correspond to the locations of the data on the actual physical drive. In the event of a crash (whether the operating system crash or the file system crash), the existence of this additional metadata will help restore the data to exactly the locations where the data belongs, whether partial restoration or full restoration.

Normally, if the operating system crashes and cannot be recovered using standard reboot mechanisms, the computer would need to be restored using other mechanisms. For example, the special file with the backup can also include an operating system. This can be a limited operating system, without many of the "bells and whistles", whose sole purpose is to get the computer booted up, and then restoring the data from the backup in the special file. As an alternative, the operating system needed for the emergency boot up can come from an external medium, such as a flash drive or a CD ROM, and the restoration software can also be provided on the external medium, or can be part of the special backup file.

In a worst case scenario, if the disk is completely corrupted and cannot be readily restored, then the disk would need to be scanned to identify where the special backup file is located. The location of the file can be identified, for example, through signatures (for example, hashes), or the existence of known binary strings for example, some special string in the beginning of the file that indicates where the file begins, or some other unique IDs or other unique information. Preferably, the special file would be located close to the beginning of the disk, to reduce the amount of time needed to scan the disk to identify the location of the file.

Once the beginning of the special file is identified on the corrupted disk, the rest of the file can be read off the disk, given the other information embedded in the beginning of the file, such as file size, location of the data of the special file (aside from any formatting issues relating to how the data is structured within the special file), and the data can be thereby restored. Once the special file is recovered, then the process of restoring the operating system and then restoring the data that is backed up can proceed.

With reference to FIG. 13, an exemplary system for implementing the invention includes a general purpose computing device in the form of a computer or server 20 or the like, including a processing unit 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes a read-only memory (ROM) 24 and random access memory (RAM) 25. A basic input/output system 26 (BIOS), containing the basic routines that help to transfer information between the elements within the personal computer 20, such as during start-up, is stored in ROM 24.

The computer 20 may further include a hard disk drive 27 for reading from and writing to a hard disk, not shown herein, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively.

The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (e.g., Microsoft Windows™ 2000). The computer 20 includes a file system 36 associated with or included within the operating system 35, such as the Windows NT™ File System (NTFS), one or more application programs 37, other program modules 38 and program data 39. A user may enter commands and information into the personal computer 20 through input devices such as a keyboard 40 and pointing device 42.

Other input devices (not shown) may include a microphone, joystick, game pad, satellite dish, scanner or the like. These and other input devices are often connected to the processing unit 21 through a serial port interface 46 that is coupled to the system bus, and they may also be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers 49. The remote computer (or computers) 49 may be another personal computer, a server, a router, a network PC, a peer device or other common network node, and it typically includes some or all of the elements described above relative to the personal computer 20, although here only a memory storage device 50 is illustrated. The logical connections include a local area network (LAN) 51 and a wide area network (WAN) 52. Such networking environments are common in offices, enterprise-wide computer networks, Intranets and the Internet.

In a LAN environment, the personal computer 20 is connected to the local network 51 through a network interface or adapter 53. When used in a WAN networking environment, the personal computer 20 typically includes a modem 54 or other means for establishing communications over the wide area network 52, such as the Internet.

The modem 54, which may be internal or external, is connected to the system bus 23 via the serial port interface 46. In a networked environment, the program modules depicted relative to the personal computer 20, or portions thereof, may be stored in the remote memory storage device. It will be appreciated that the network connections shown are merely exemplary and other means of establishing a communications link between the computers may be used.

Such computers as described above can be used in conventional networks, e.g., the Internet, local area networks, regional networks, wide area networks, and so forth. These networks can link various resources, such as user computers, servers, Internet service providers, telephones connected to the network, and so on.

Having thus described a preferred embodiment, it should be apparent to those skilled in the art that certain advantages of the described method and apparatus have been achieved. It should also be appreciated that various modifications, adaptations, and alternative embodiments thereof may be made within the scope and spirit of the present invention. The invention is further defined by the following claims.

What is claimed is:

1. A system for data backup, the system comprising:
a set of data blocks located on a storage media subject to a backup;
a hidden backup storage for backup of the set of data blocks, wherein the hidden backup storage is not visible to a file system, user processes, an operating system and to an operating system's data storage driver with the hidden backup storage on the storage media appearing as free space to the operating system's data storage driver, the hidden backup storage being visible to backup/restore application;
an intermediate container located on the storage media;
a module for generating a bitmap of the set of data blocks, the bitmap defines backed up data blocks of the storage media and contains numbers of data blocks and locations of the data blocks on the storage media,
the module configured to:
receive a request to write a block of data to an area occupied by the hidden backup storage,
upon receipt of the request to write the block of data to the area occupied by the hidden backup storage, transfer data from a corresponding block of the hidden backup storage to the intermediate container,
write the block of data to the area; and
write the data transferred from the corresponding block of the hidden backup storage stored in the intermediate container to free space on the storage media.

2. The system of claim 1, wherein the bitmap contains locations of the data blocks within the hidden backup storage.

3. The system of claim 1, wherein the hidden backup storage comprises:
a service data block;
a backup metadata;
the bitmap;
a file system; and
a backed up data.

4. The system of claim 3, wherein the hidden backup storage is on the same partition as the set of data blocks subject to the backup.

5. The system of claim 1, wherein the hidden backup storage is on the same partition as the set of data blocks subject to the backup.

6. The system of claim 1, wherein the module is further configured to mark the set of data blocks backed up in the bitmap.

7. The system of claim 1, wherein the set of data blocks subject to the backup comprises a snapshot of data blocks for backup, and the method further comprises performing subsequent backups wherein the subsequent backups are incremental backups.

8. The system of claim 7, wherein the backup is an incremental backup.

9. The system of claim 7, wherein the backup is a full backup.

10. The system of claim 7, wherein the backup is a data block backup.

11. The system of claim 7, wherein the backup is a file-level backup.

12. A computer-implemented method for data backup, the method comprising:
generating a bitmap of a set of data blocks located on a storage media subject to a backup, the bitmap defining backed up data blocks of the storage media and contains numbers of data blocks and locations of the data blocks on the storage media;
receiving a request to write a block of data to an area occupied by a hidden backup storage for backup of the set of data blocks, wherein the hidden backup storage is not visible to a file system, user processes, an operating system and to an operating system's data storage driver with the hidden backup storage on the storage media appearing as free space to the operating system's data storage driver, the hidden backup storage being visible to backup/restore application;
upon receipt of the request to write the block of data to the area occupied by the hidden backup storage, transferring data from a corresponding block of the hidden backup storage to an intermediate container located on the storage media;
writing the block of data to the area; and
writing the data transferred from the corresponding block of the hidden backup storage stored in the intermediate container to free space on the storage media.

13. The method of claim 12, wherein the bitmap contains locations of the data blocks within the hidden backup storage.

14. The system of claim 12, wherein the hidden backup storage comprises:
a service data block;
a backup metadata;
the bitmap;
a file system; and
a backed up data.

15. The method of claim 12, wherein the hidden backup storage is on the same partition as the set of data blocks subject to the backup.

16. The method of claim 15, wherein the hidden backup storage is on the same partition as the set of data blocks subject to the backup.

17. The method of claim 16, wherein the module is further configured to mark the set of data blocks backed up in the bitmap.

18. The method of claim 16, wherein the set of data blocks subject to the backup comprises a snapshot of data blocks for backup, and the method further comprises performing subsequent backups wherein the subsequent backups are incremental backups.

* * * * *